US012311840B2

(12) United States Patent
Gorfer et al.

(10) Patent No.: US 12,311,840 B2
(45) Date of Patent: May 27, 2025

(54) LIGHTING DEVICE, INTERIOR TRIM ASSEMBLY INCLUDING THE LIGHTING DEVICE AND METHOD OF MANUFACTURING A TRIM ASSEMBLY (71) Applicant: International Automotive Components Group NA, Inc., Southfield, MI (US)

(72) Inventors: Robert Gorfer, Ebersberg (DE); Carter Scott Cannon, Munich (DE)

(73) Assignee: International Automotive Components Group North America, Inc., Southfield, MI (US)

( * ) Notice: Subject to any disclaimer, the term of this patent is extended or adjusted under 35 U.S.C. 154(b) by 0 days.

(21) Appl. No.: 18/682,290

(22) PCT Filed: Aug. 10, 2022

(86) PCT No.: PCT/EP2022/072462
§ 371 (c)(1),
(2) Date: Feb. 8, 2024

(87) PCT Pub. No.: WO2023/017088
PCT Pub. Date: Feb. 16, 2023

(65) Prior Publication Data
US 2024/0336190 A1  Oct. 10, 2024

(30) Foreign Application Priority Data

Aug. 10, 2021 (DE) ........................ 102021120794.0

(51) Int. Cl.
*B60Q 3/54* (2017.01)
*B60Q 3/217* (2017.01)
(Continued)

(52) U.S. Cl.
CPC ............... *B60Q 3/54* (2017.02); *B60Q 3/217* (2017.02); *B60Q 3/62* (2017.02); *G02B 6/001* (2013.01); *B60Q 3/64* (2017.02); *B60Q 3/66* (2017.02)

(58) Field of Classification Search
CPC ... B60Q 3/62; B60Q 3/64; B60Q 3/66; B60Q 3/54; B60Q 3/217
See application file for complete search history.

(56) References Cited

U.S. PATENT DOCUMENTS

2010/0142226 A1* 6/2010 Vogt .................... B60Q 3/64
362/625
2013/0058115 A1* 3/2013 Pfeil ..................... G02B 6/001
362/511
(Continued)

FOREIGN PATENT DOCUMENTS

DE          10033774 A1    1/2002
DE      102004044035 A1 *  3/2006  ............... B60Q 3/51
(Continued)

OTHER PUBLICATIONS

Machine translation of WO 2018146397 A1 retrieved from the FIT database of PE2E search. (Year: 2024).*
(Continued)

*Primary Examiner* — Colin J Cattanach
(74) *Attorney, Agent, or Firm* — Grossman, Tucker, Perreault & PFleger, PLLC; Steven J. Grossman (57) ABSTRACT A lighting device for an interior trim part includes a light strip; a light strip carrier attached to the light strip along the length of the light strip, the light strip carrier including a laminar material; an adapter to which the light strip carrier is attached along the length of the light strip; wherein the adapter is configured to be attached to a rear side of an trim part to position the light strip at a front side of the trim part.

18 Claims, 6 Drawing Sheets (51) Int. Cl.
*B60Q 3/62* (2017.01)
*B60Q 3/64* (2017.01)
*B60Q 3/66* (2017.01)
*F21V 8/00* (2006.01)

(56) References Cited

U.S. PATENT DOCUMENTS

2014/0338156 A1  11/2014  Bayersdorfer et al.
2019/0001877 A1  1/2019  Unger
2020/0123684 A1  4/2020  Nishimura

FOREIGN PATENT DOCUMENTS

| DE | 102013208832 A1 | | 11/2014 | | |
| EP | 3514013 A1 | * | 7/2019 | ............. | B60Q 3/217 |
| FR | 2886238 A1 | | 12/2006 | | |
| FR | 3077046 A1 | | 7/2019 | | |
| JP | 2020066374 A | | 4/2020 | | |
| WO | WO-2018146397 A1 | * | 8/2018 | ............. | B60Q 3/217 |

OTHER PUBLICATIONS

Machine translation of EP 3514013 A1 retrieved from the FIT database of PE2E search. (Year: 2024).*
Machine translation of DE 102004044035 A1 retrieved from the FIT database of PE2E search. (Year: 2024).*

* cited by examiner

LIGHTING DEVICE, INTERIOR TRIM ASSEMBLY INCLUDING THE LIGHTING DEVICE AND METHOD OF MANUFACTURING A TRIM ASSEMBLY

RELATED APPLICATIONS

This application is a National Phase Application filed under 35 USC § 371 of PCT Application No. PCT/EP2022/072462 with an international filing date of Aug. 10, 2024, which claims priority of German Patent Application No. 102021120794.0 filed Aug. 10, 2021. Each of these applications is herein incorporated by reference in its entirety for all purposes.

BACKGROUND

This invention relates to a lighting device, an interior trim assembly including a lighting device, and a method of manufacturing a trim assembly, in particular for a passenger cabin of a vehicle.

In the interior of automotive vehicles, trim parts are employed which have a multitude of tasks, such as sound insulation, providing support for display and functional units, improving the aesthetic appearance and the like. Furthermore, a plurality of illumination and display units are found in the interior of an automotive vehicle, which may serve for cabin illumination or background illumination, which illuminate individual objects for aesthetic reasons or for orientation, which may indicate functional states of the automotive vehicle, serve as information or warning signal and much more. Increasingly, illumination and display units are found which are integrated in the interior trim part.

It is an object of this invention to provide a lighting device, an interior trim assembly including a lighting device, and a method of manufacturing a trim assembly, in particular for the passenger cabin of a vehicle, which are easily assembled and flexible in terms of retrofitting and upgrading of the interior trim assembly.

SUMMARY

According to one aspect, a lighting device is provided, in particular a lighting device which is to be integrated in an interior trim assembly of an automotive vehicle, the lighting device including a light strip; a light strip carrier attached to the light strip along the length of the light strip, the light strip carrier including a laminar material; and an adapter to which the light strip carrier is attached along the length of the light strip. The adapter is configured to be attached to a rear side of an trim part to position the light strip at a front side of the trim part. This lighting device is easily assembled with the interior trim assembly by fitting the adapter to the rear side of the trim part and by routing the light strip carrier to the front sight of the trim part so that light emitted from the light strip is visible in an interior cabin of the vehicle. The lighting device may be designed in such a way that a same interior trim assembly may be provided to be fully functional with or without lighting device. The lighting device does not require any dedicated fastener, receptacle and no specific dedicated and/or extra space to be mounted at the interior trim assembly.

In one or more examples, the light strip is configured to emit light to a side thereof and, for example, may be provided in the form of a light guide. The light guide may be associated with at least one LED and/or at least one laser diode for introducing light into the light guide. For example, two LEDs may be provided at the two ends of the light guide, or one laser diode may be provided at one end of the light guide. In another example, the light strip includes an LED or micro LED light strip.

In one or more examples, the light strip carrier includes a flexible textile, foil or sheet material. The light strip carrier also may include a self-supporting material which may be flexible or may be rigid and may be shaped to be adapted to a mounting position of the light strip carrier. Specific examples of materials of the light strip carrier are thermoplastics, a fiber compressed panel, a non-woven fabric, a woven fabric and elastomeric materials. A light strip carrier of this type may safely support the light strip and, being flexible and essentially laminar, the light strip carrier can be passed from the front side of the interior trim assembly to its rear, between two adjacent trim part, without requiring extra space for passing the light strip carrier there between. The thickness of the material can be chosen to accommodate the gap between the adjacent trim parts.

In one or more examples, the light strip carrier includes a translucent or transparent material and envelopes the light strip along the length of the light strip. This allows providing a well protected light guide or other light strip to be attached to the adapter, coupling the light strip and the light strip carrier and protecting the light strip against external influences, such as humidity, scratching, particular matter etc. In some examples, the light strip carrier also may include a UV resistant characteristic to protect the light strip, e.g. a light guide material, against degradation due to ambient light. In this or other examples, the light strip carrier further may include light shaping elements surrounding the light strip, such as facets and/or other light directing, scattering, diffusing or focusing structures, or the like.

In one or more examples, the light strip carrier is attached to the adapter by welding, overmolding, adhesive or mechanical fasteners or a combination of two or more of these. Attachment may be by ultrasound welding, for example, which is a manufacturing process readily available in the manufacture of an interior trim assembly of a vehicle. This provides a particularly easy and efficient way of mounting the light strip carrier to the adapter.

In one or more examples, the adapter is a self-supporting laminar part. For example, the adapter is an injection molded plastic component, a 3D printed plastic component or a sheet metal component formed by bending and/or stamping. In one or more examples, the adapter comprises a reinforcement and/or impact structure. The adapter may for example comprise reinforcement ribs, an undulating reinforcing structure, a honeycomb reinforcing structure or the like. The adapter also may be a reinforcement or impact structure at the rear side of an interior trim part which, to provide the lighting device of this invention, is combined with the light strip by attaching the light strip carrier to the adapter. The adapter having the reinforcement or impact structure may be permanently or removably attached to the rear side of the trim part.

In one or more examples, the adapter comprises a first physical feature configured for positive engagement with the trim part. In these examples, the adapter shall be a component separate from the trim part and it can be removably or permanently attached to the rear side of the trim part by positive engagement.

According to another aspect, an interior trim assembly of a vehicle is provided which is to be combined with a lighting device as described above. The interior trim assembly may comprise a first interior trim panel having, at a rear face thereof, a second physical feature configured for positive engagement with the first physical feature of the adapter. The interior trim assembly may further comprise a second interior trim part connected to the first interior trim part wherein a junction is formed between the first interior trim part and the second interior trim part and the light strip is located at the junction at a front face of the first interior trim part and the second interior trim part. In particular, the light strip carrier can pass at the junction between the first interior trim part and the second interior trim part, from the front face to the rear face thereof, wherein the adapter is located at the rear face of the first interior trim part and the second interior trim part. In this interior trim assembly, the lighting device can be mounted without modifying the interior trim assembly from one not having the lighting device. In other words, a single version of the interior trim assembly can be provided and can be equipped with or without the lighting device.

In various examples, the interior trim assembly can be part of one or more of an interior paneling of a vehicle door, an instrument panel, a pillar paneling, a floor console paneling, an overhead system paneling, a head liner, and a window or door scuff plate assembly, for example. In general, the lighting device can be provided at any interior trim pat having an interface or junction with another trim part or another vehicle component. The lighting device may be provided at the junction or interface between two trim parts or between a trim part and an adjacent vehicle component.

In a further aspect, a method of manufacturing a trim assembly is provided, the method comprising mounting a light guide, enveloped by a laminar carrier, on an adapter by attaching the laminar carrier to the adapter; mounting the adapter at a rear side of a first trim part; and mounting a second trim part to the first trim part such that the light guide is located at a junction between the first trim part and the second trim part at a front side of the first trim part and the second trim part and the laminar carrier bridges a space between the front side and the rear side and passes in between the first trim part and the second trim part. In one example, the laminar carrier is attached to the adapter by welding, in particular ultrasonic welding. In this or another example, the adapter is mounted to the rear side of the first trim part by positive engagement.

SHORT DESCRIPTION OF DRAWINGS

Examples are described below with reference to the drawings, wherein.

DESCRIPTION OF EXAMPLES

In the context of this disclosure, if reference is made to a rear side or a front side or to a rear surface or a front surface of a component, this refers to the respective side or surface as seen from the interior of the vehicle cabin or other space in which the lighting device or trim assembly is mounted. More generally, where the spatial relationship of individual parts of the interior trim part is described, in the following, this spatial relationship refers to the installed condition, wherein the front of the interior trim part is the side facing towards the passenger cabin and the rear side is facing away from the passenger cabin. The indication that a first part is located in front of or behind a second part means that the first part is located on the side facing the passenger cabin or on the side facing away passenger cabin, respectively.

Figure 1:
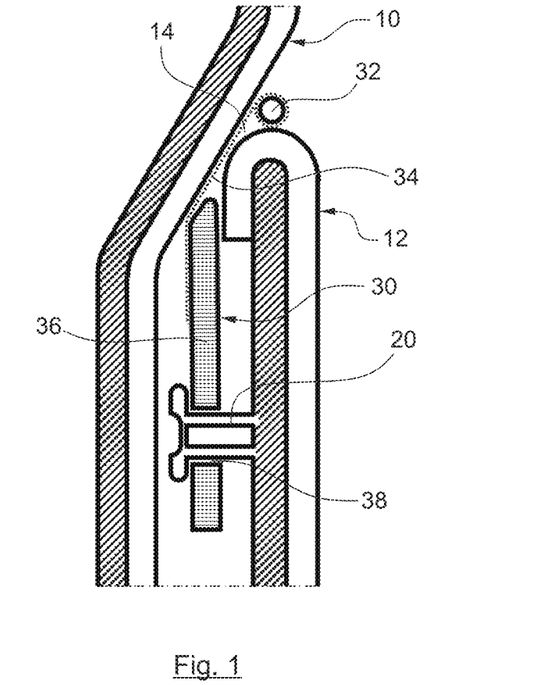
FIG. 1 shows a schematic cross sectional view of a trim assembly according to an example.
Figure 2:
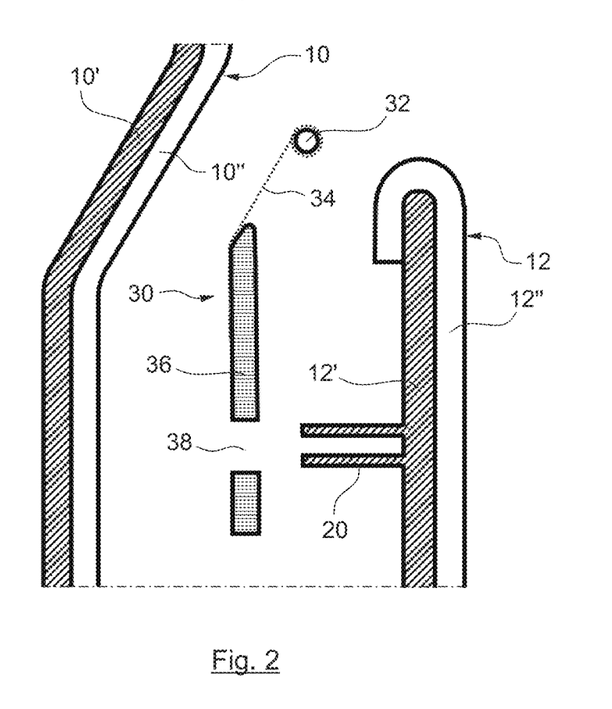
FIG. 2 shows an exploded schematic cross-sectional view of the trim assembly according to the example.
Figure 3:
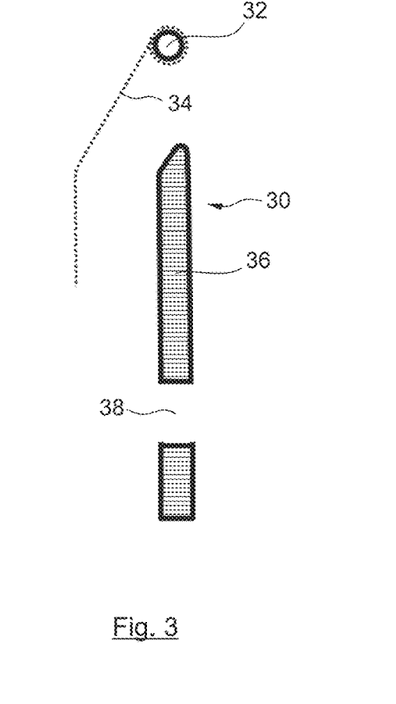
FIG. 3 shows an exploded schematic cross-sectional view of a lighting device according to an example.

FIGS. 1 and 2 show schematic cross sectional views, assembled and exploded, of a trim assembly according to an example. In this example, the trim assembly is an interior door lining of an automotive vehicle. The trim assembly comprises an upper trim part 10 and a lower trim part 12 which are joined at a junction or interface 14. Both of the upper trim part 10 and lower trim part 12 may comprise a substrate 10', 12' and, at the front face of the substrate, may be covered by a foam layer and/or a decorative layer 10", 12". One of more mechanical fasteners (only one is shown), at the rear side of the lower trim part 12 may be provided to couple the upper and lower trim parts 10, 12 and to couple further interior components arranged between the trim assembly and an opposite body portion of the vehicle, such as a lighting device, specified further below. Respective mating mechanical fastener pairs (not shown) may be provided, among others, to couple to each other the upper and lower trim parts 10, 12 and to couple to the upper trim part 10 further interior components arranged between the trim assembly and the opposite body portion of the vehicle.

FIGS. 1 and 2 further illustrates a lighting device 30 which is to be arranged between the upper trim part 10 and the lower trim part 12 and which is shown in further detail in later figures. The lighting device 30 of this example comprises a light guide 32, which is an example of a light strip, and a light guide carrier 34, which is an example of a light strip carrier, attached to the light guide 34 along the length of the light guide 34. In this and other examples, the light guide 32 extends along the entire or substantially the entire length of the junction 14 between the upper and lower trim parts 10, 12. In other examples, the light guide or another light strip may extend along a portion of the junction 14 between two trim parts or between a trim part and another adjacent component. The lighting device 30 further comprises an adapter 36 to which the light guide carrier 34 is attached along the length of the light guide 32. In this example, the light guide carrier 34 and the adapter 36 both comprise a laminar material or structure which allows arranging the adapter 36 at the rear side of the lower trim part 12 and the light guide carrier 34 at the junction 14 between the upper and lower trim parts 10, 12, without significant space requirements.

A laminar material or structure refers to a material or structure which is substantially flat and thin relative to its length and width dimensions. For example, the light guide carrier 34 and the adapter 36 may extend along substantially the entire length of the light guide 32, in a length direction, and may have a width, perpendicular to the length direction, which is in the range of about 0.5 cm to 5 cm or about 1 cm to 10 m, for example. The width of the adapter 36 may be larger than the width of the light guide carrier 34. For example, the light guide carrier 34 can be made from a material having a thickness, perpendicular to the width and length directions, in the range of a few tenth of a millimeter to a few millimeter. The thickness of the carrier accommodates a desired gap between adjacent trim parts. Further, the lighting device as such may have an enlarged thickness in a region of the light guide 32 or light strip, depending on the type and thickness of the light guide or light strip. Further, the adapter 36 may have a thickness in the range of 1 or 2 mm or may be thicker, e.g. up to 5 mm or 10 mm, depending design requirements.

In some examples, the light guide carrier 34 may include or consist of a textile, foil or another thin and flexible sheet material. In some examples, the light guide carrier 34 may comprise a material web which envelopes the light guide along the length of the light guide and may have two opposite web portions which are joined at and extend from a side of the light guide along the length thereof, as shown schematically in FIG. 4. In this example, the light guide carrier 34 may processed as a piping tape (German: Paspelband), with the light guide 32 enveloped in a pipe portion thereof.

The light guide 32 of this and other examples may be a flexible transparent fiber or fiber bundle or tube and, generally, may be made of or may include one or more optical fibers or transparent dielectric waveguide made of plastic, to provide a side-emitting design. Examples are PMMA, glass and PC polymer optical fibers (POF). A side-emitting design refers to a light guide or light strip design which emits light to a side of the light guide/strip, along the length of the light guide/strip.

Figure 4:
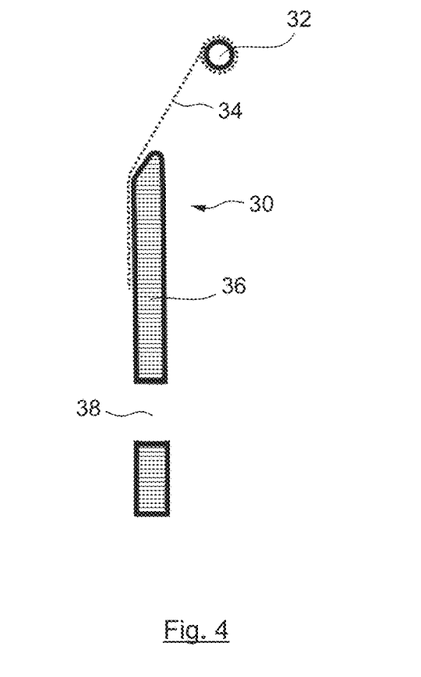
FIG. 4 shows a schematic cross-sectional view of the lighting device according to the example.
Figure 5A:
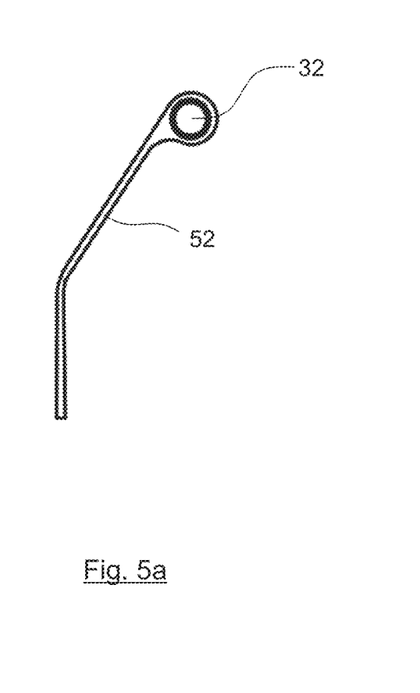
FIGS. 5*a* to 5*c* show schematic views of different examples of light strips and carriers to be used in a lighting device.

In another example, shown in FIG. 5a, the light guide 32 is assembled in an extruded profile 52, forming a sleeve, to be shaped and trimmed, for a side-emitting design. The extruded profile 52 serves as a light guide carrier. The extruded profile 52 may be attached to an adapter, such as the adapter 36 shown in FIG. 4.

The light guide carrier 34, 52 in these and other examples may be joined to the adapter 36 by welding, such as ultrasonic welding. In other examples, it may be joined to the adapter 36 by over-molding, adhesive, mechanical fasteners or combination of two or more of these.

Figure 5B:
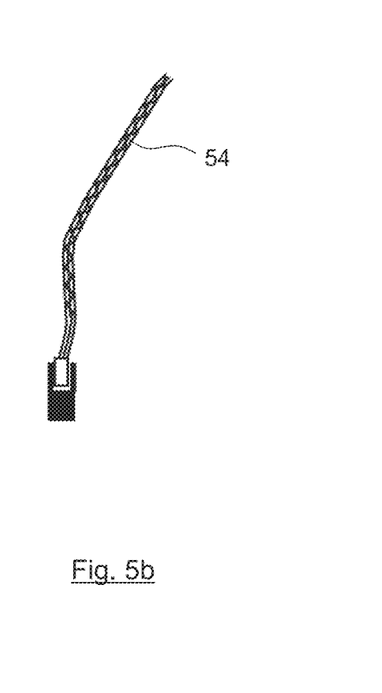
Figure 5C:
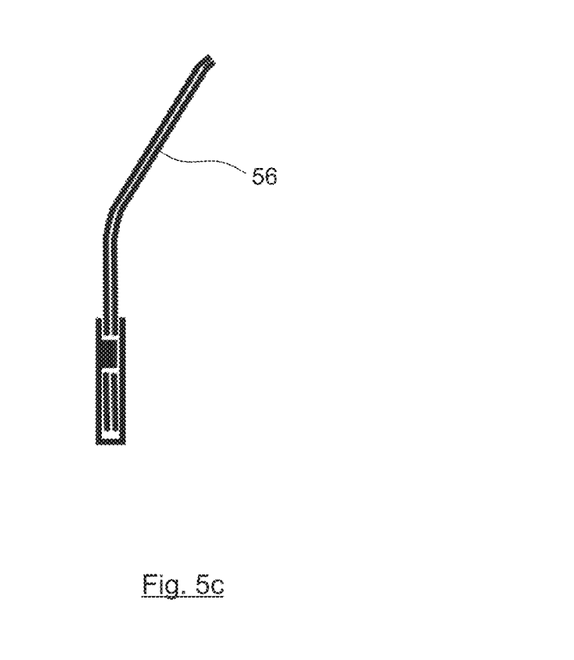

In another example, illustrated in FIG. 5b, the lighting device comprises a PMMA POF or textile light strip 54 for an end-emitting design. In this example, a number of POFs may be arranged side by side to provide a light emitter at end faces of optical fibers, to be arranged along the junction 14 of the two trim parts 10 12, for example. An end-emitting design refers to a light guide or light strip design which emits light at end faces of optical fibers, which may be arranged in a row side-by-side, to generate light emission along the length of e.g. a light strip which is assembled from a number of adjacent optical fibers. The light strip 54 may be attached to an adapter, such as the adapter 36 shown in FIG. 4, wherein the optical fibers provide a carrier of the light strip. In another example, illustrated in FIG. 5c, the lighting device comprises a PMMA or PC planar light guide 56 for a side-emitting design. The planar light guide 56 integrates the light strip and the carrier of the light strip. The light guide 56 may be attached to an adapter, such as the adapter 36 shown in FIG. 4.

Figure 6A:
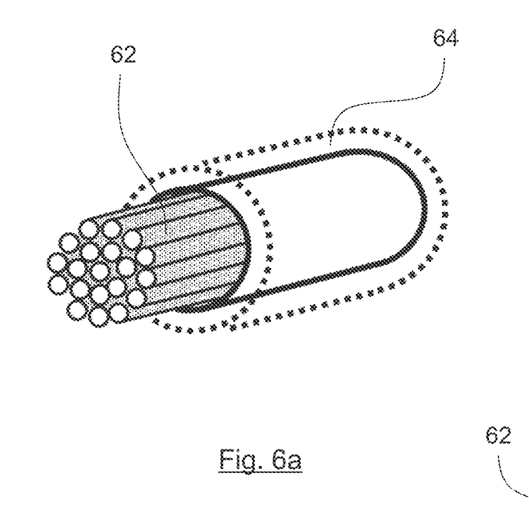
FIGS. 6*a* to 6*c* show schematic views of different examples of light strips/light guides to be used in a lighting device.
Figure 6B:
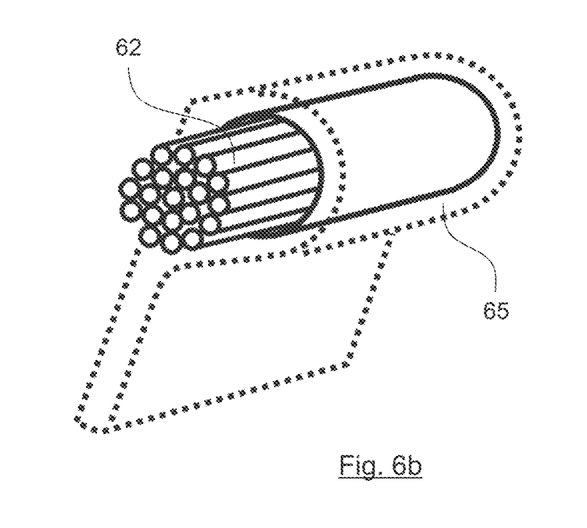
Figure 6C:
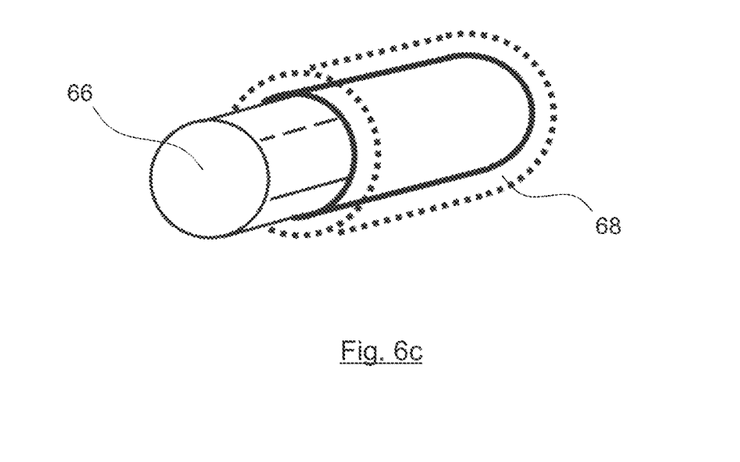

FIG. 6a Illustrates an example of a light guide including a fiber bundle 62 enveloped by a translucent sleeve 64, wherein the fiber bundle 62 may include extruded PMMA optical fibers or glass optical fibers, for example. FIG. 6b illustrates the example of a light guide including a fiber bundle 62, enveloped by a translucent extruded profile 65 which may form a light guide carrier to attached a lighting device to a trim part, as explained with reference to FIGS. 1 to 4. FIG. 6c illustrates another example of a light guide including an extruded polymer optical filament 66, enveloped by a translucent sleeve 68.

Figure 7:
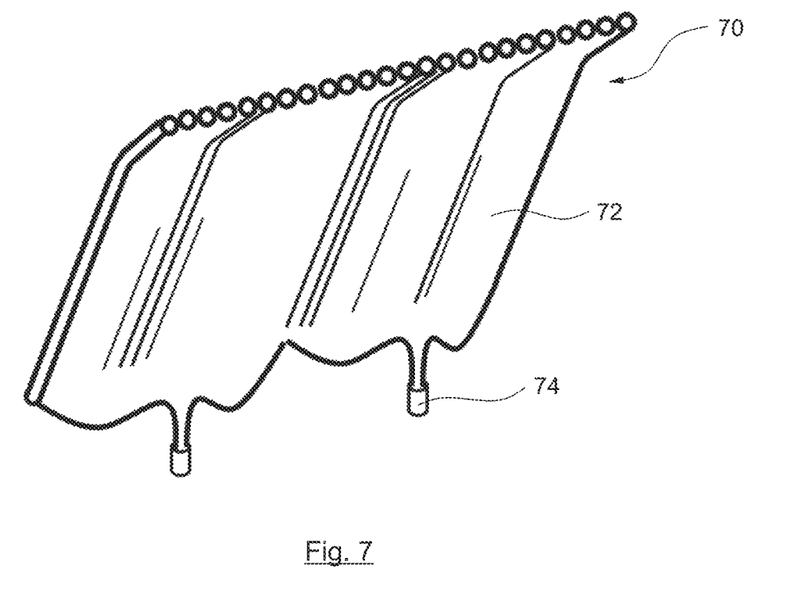
FIG. 7 shows a schematic view of a light strip and carrier to be used in a lighting device, according to another example.
Figure 8:
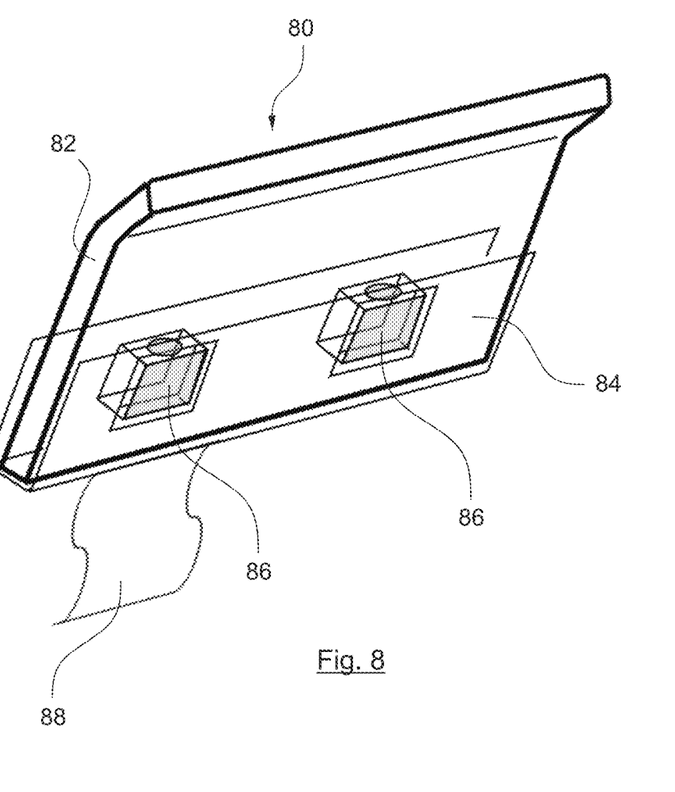
FIG. 8 shows a schematic view of a light strip and carrier to be used in a lighting device, according to another example.

FIG. 7 illustrates another example of a lighting device 70 which includes or is made from a PMMA POF Jacquard Textile 72 for an end-emitting design. The Jacquard Textile 72 integrates the light strip and the carrier of the light strip in a single component. Another example of a lighting device 80 is shown in FIG. 8, including a PMMA or PC planar light guide 82, including optics and/or a reflector 84 and a number of LEDs 86 as light sources. The planar light guide 82 integrates the light strip and the carrier of the light strip in a single component. The lighting device 70 or 80 may be attached to an adapter, such as the adapter 36 shown in FIG. 4. FIGS. 7 and 8 also show connectors 74, 88 to provide electrical power and control signals to the lighting device 70, 80. Such connectors 74, 88 may be implemented as individual connectors, plugs, solder connectors, flexible circuits or the like. Connectors also may be provided at the other lighting devices described herein, although not shown in detail.

Whereas this is not shown in detail in all of the examples, each of the examples of lighting devices may include light sources, such as one a more LEDs or laser diodes and further may include optics, reflectors or other light shaping elements to focus, diffuse, scatter, divert, direct or otherwise manipulate light emitted from the lighting device.

The light guides or light strips, in general, in the end-emitting design and in the side-emitting design, may emit light along part of their length or along their entire length, continuously or in intermittent sections. A light source (not shown) may be coupled to the light guide or light strip, such as one or more LEDs, micro LEDs and/or one or more laser diodes. Instead of one or more light guides, for example, a light strip including a number of LEDs on micro LEDs may be provided.

In this example, where the light guide carrier 34, 52, 64 is made from a material enveloping the light guide 32, the light guide carrier 34, 52, 64, at least in part, is made from a translucent or transparent material to allow the light from the light guide 32 to be emitted into the vehicle cabin.

In the example of FIGS. 1 to 4, the adapter 36 is a self-supporting laminar plastic component which may be manufactured by injection molding or 3D printing, for example. In another example, the adapter also can be made from sheet metal. The adapter 36 comprises one or more through holes 38 and also may comprises recesses which are examples of physical features configured for positive engagement with the trim assembly and, in this example, with the lower trim part 12. In this example, the through hole 38 is shaped to engage with the mechanical fasteners 20, at the rear side of the lower trim part 12, to attach the adapter 36 to the lower trim part 12, as shown in FIG. 1, for example.

The through hole(s) 38 and recess(es), if any, in combination with the mechanical fastener(s) 20, may provide a positive fit engagement between the adapter 36 and lower trim part 12, for example a snap fit. The mechanical fasteners 20, in one example, also may be rotatable along a longitudinal axis thereof to lock the engagement between the mechanical fasteners 20 and the through hole(s) 38 or recess(es). The mechanical fastener 20 further may be a fastener which also serves a basic function of connecting the upper and lower trim parts 10, 12 or connecting further components to the rear side of the lower trim part 12. The mechanical fastener 20 and the through hole 38 are examples of physical features for providing positive engagement between the adapter 36 and the lower trim part 12.

In further examples, the adapter 36 may comprise a reinforcement or impact structure or a combination thereof and may extend over a larger portion of the rear side of the lower trim part 12. In a further variation, the adapter 36 may be coupled to the upper trim part 10.

In an example of assembling the interior trim assembly of this disclosure, the unit of light guide 32 and light guide carrier 34 are welded to the adapter 36, e.g. by ultrasonic welding, to provide a lighting device, as shown in FIGS. 4, for example. The lighting device is then mounted at the rear side of the lower trim part 12, as shown in FIG. 1, by positive engagement between the through hole 38 of the adapter 36 and the mechanical fastener 20, for example. The light guide 34 is arranged at the front of the lower trim part 12, by guiding the light guide carrier 34 across the upper edge of the lower trim part 12. Then, the upper trim part 10 is attached to the lower trim part 12 by mounting the lower support structure 26 of the upper trim part 10 to the rear side of the lower trim part 12, with the adapter 36 of the lighting device sandwiched there between. During assembly, it is ensured that the light guide 32 is placed at the junction 14 between the upper and lower trim parts 10, 12, at the front side thereof.

The adapter shown in FIGS. 1 to 4 or a modification thereof may be used in combination with any of the light strips of FIGS. 5a to 9.

Figure 9:
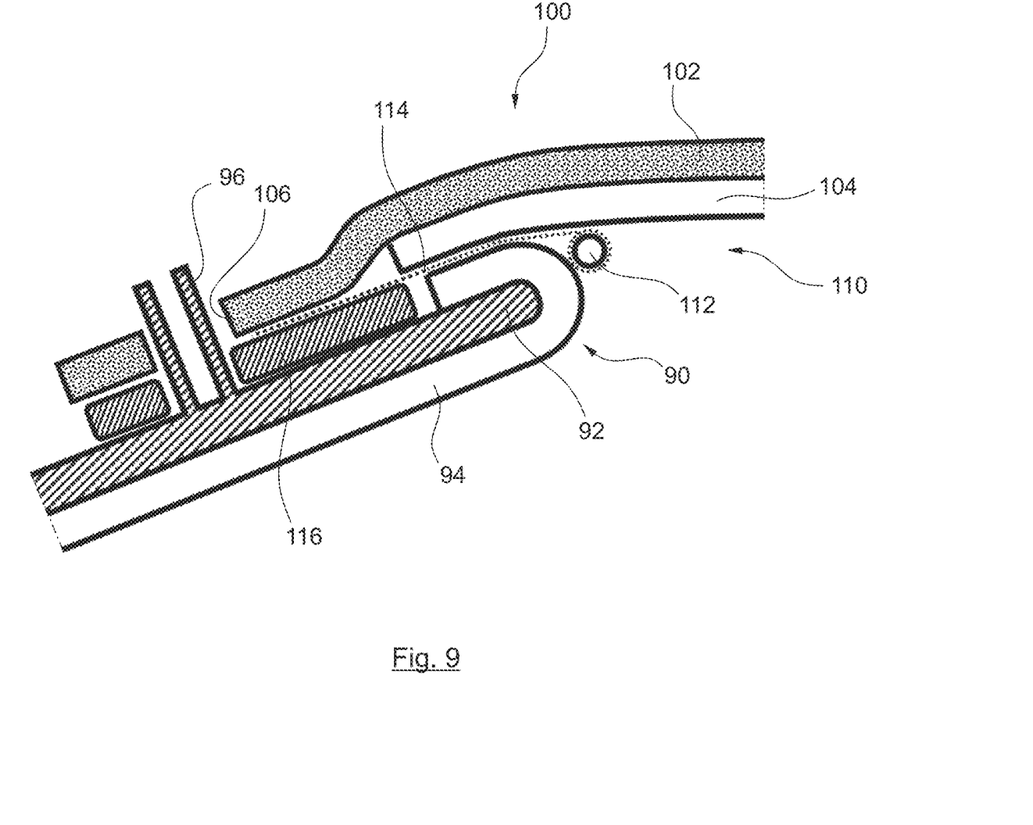
FIG. 9 shows a schematic cross sectional view of a trim assembly according to another example.

In an example shown in FIG. 9, the interior trim assembly is part of a headliner assembly, including a frame trim part 90 and a headliner 100. The frame trim part 19 comprises a frame support 92 and a frame cover layer 94 which may include e.g. a foam layer and a decorative cover. The headliner 100 may comprise a headliner support 102 and a headliner cover layer 104 which also may include e.g. a foam layer and a decorative cover. At the rear side of the frame trim part 90, a mechanical fastener 96 may be provided for connecting the frame trim part 90 and the headliner 100. For a respective mechanical connection, a through hole 106, recess or other mating mechanical feature to engage with the mechanical fastener 96 may be provided in or at the headliner support 102. A lighting device 110 may be inserted between the frame trim part 90 and the headliner 100, basically as explained with respect to FIGS. 1 to 4, to locate a light guide or light strip 112 at the junction between the frame trim part 90 and the headliner 100, at a front face thereof. In particular, a light strip carrier 114 attached to the light strip 112 can pass at the junction between the frame trim part 90 and the headliner 100, from the front face to the rear face thereof. The thickness of the light strip carrier 114 may be adapted to accommodate the gap between the frame trim part 90 and the headliner 100. The light strip carrier 114 is attached to an adapter 116 that may be located at the rear face of frame trim part 90 and can be attached to the frame trim part 90 by engagement with the fastener 96. The light strip carrier 114 may be attached to the adapter 116 by adhesive or welding, for example. In this example, the adapter 114 is sandwiched between the frame support 92 and the headliner support 102. Accordingly, the same fasteners which are used for connecting two trim part or which are used for connecting one trim part to another component of the vehicle, also may be used to attach the lighting device. In this interior trim assembly, the lighting device can be mounted without modifying the interior trim assembly from one not having the lighting device. In other words, a single version of the interior trim assembly can be provided and can be equipped with or without the lighting device.

The same interior trim assembly, including the upper and lower trim parts 10, 12 or the frame trim part 90 and the headliner 100, may be completed with or without lighting device. Moreover, an adapter having a reinforcement and/or impact structure may be sandwiched between the front and rear trim parts 10, 12, with or without a light guide. The lighting device may be provided to retrofit or upgrade an interior trim assembly.

The lighting device may provide ambient and/or orientation light and may be designed to emit different color light which can be controlled to statically emit light of one brightness and color hue or to emit light of dynamically changing color hue and/or brightness. To design the light guide as an adjustable light emitter, a multicolor LED or laser LED light source or multiple LEDs may be provided to feed a light beam to the light guide and may be controlled by an onboard control system of the vehicle.

Whereas the invention has been described by way of example, with reference to one embodiment and its variations, further modifications, additions and omissions can be made within the scope of the claims. The description of the different examples is not intended to limit the invention to the particular feature combinations disclosed herein. Features of different examples may be omitted, added or combined, wherever technically feasible.

What is claimed is:

1. A lighting device, including:
   a light strip;
   a light strip carrier attached to the light strip along a length of the light strip, the light strip carrier including a flexible textile, foil or sheet material;
   an adapter, to which the light strip carrier is attached along the length of the light strip;
   wherein the adapter is configured to be attached to a rear side of a lower trim part between the rear side of the lower trim part and a front side of an upper trim part, the light strip carrier is configured to lay within a junction between the upper trim part and the lower trim part, and the light strip is positioned at a front side of said junction,
   wherein the light strip has a thickness and the junction between the upper trim part and the lower trim part has a width, the thickness of the light strip being greater than the width of the junction.

2. The lighting device of claim 1, wherein the light strip is configured to emit light to a side thereof.

3. The lighting device of claim 1, wherein the light strip includes a light guide.

4. The lighting device of claim 3, wherein the light guide is associated with at least one LED and/or at least one laser diode.

5. The lighting device of claim 1, wherein the light strip includes an LED or micro LED light strip.

6. The lighting device of claim 1, wherein the light strip carrier includes a self-supporting material.

7. The lighting device of claim 1, wherein the light strip carrier includes a translucent or transparent material.

8. The lighting device of claim 1, wherein the light strip carrier envelopes the light strip along the length of the light strip.

9. The lighting device of claim 1, wherein the light strip carrier is attached to the adapter by welding, overmolding, adhesive, mechanical fasteners, or a combination of two or more of these.

10. The lighting device of claim 1, wherein the adapter is a self-supporting laminar plastic part.

11. The lighting device of claim 1, wherein the adapter comprises a reinforcement and/or impact structure.

12. An interior trim assembly of a vehicle, comprising:
a lighting device, the lighting device including,
    a light strip;
    a light strip carrier attached to the light strip along the length of the light strip, the light strip carrier including a flexible textile, foil, or sheet material;
    an adapter to which the light strip carrier is attached along the length of the light strip;
    wherein the adapter is configured to be attached to a rear side of a lower trim part between the rear side of the lower trim part and a front side of an upper trim part, the light strip carrier is configured to lay within a junction between the upper trim part and the lower trim part, and the light strip is positioned at a front side of said junction;
    wherein the light strip has a thickness and the junction between the upper trim part and the lower trim part has a width, the thickness of the light strip being greater than the width of the junction;
    wherein the adapter comprises a first physical feature configured for positive engagement with the lower trim part, and
    wherein said lower trim part includes a second physical feature configured for positive engagement with the first physical feature of the adapter.

13. The interior trim assembly of claim 12 wherein, the light strip carrier passes at the junction between the lower trim part and the upper trim part, from the front face to the rear face thereof.

14. The interior trim assembly of claim 12 which is part of an interior panelling of a vehicle door, an instrument panel, a pillar panelling, a floor console panelling, and overhead system panelling, a headliner, or a window or door scruff plate assembly.

15. A method of manufacturing a trim assembly, the method comprising:
    mounting a light guide enveloped by a laminar carrier, on an adapter by attaching the laminar carrier to the adapter;
    mounting the adapter at a rear side of a first trim part and mounting a second trim part to the first trim part such that the light guide is located at a junction between the first trim part and the second trim part at a front side of the first trim part and the second trim part, and the laminar carrier is within a space between the first trim part and the second trim part; wherein the first trim part forms a lower trim part; wherein the second trim part forms an upper trim part;
    wherein the light strip carrier includes a flexible textile, foil or sheet material; and
    wherein the light strip has a thickness and the junction between the upper trim part and the lower trim part has a width, the thickness of the light strip being greater than the width of the junction.

16. The method of claim 15, wherein the laminar carrier is attached to the adapter by welding.

17. The method of claim 16, wherein the laminar carrier is attached to the adapter by ultrasonic welding.

18. The method of claim 15, wherein the adapter is mounted to the rear side of the first trim part by positive engagement.

* * * * *